(12) United States Patent
Tarkkala

(10) Patent No.: US 7,444,624 B2
(45) Date of Patent: Oct. 28, 2008

(54) METHOD FOR THE SECURE INTERPRETATION OF PROGRAMS IN ELECTRONIC DEVICES

(75) Inventor: Lauri Tarkkala, Espoo (FI)

(73) Assignee: Nokia Corporation, Espoo (FI)

( * ) Notice: Subject to any disclaimer, the term of this patent is extended or adjusted under 35 U.S.C. 154(b) by 577 days.

(21) Appl. No.: 11/077,663

(22) Filed: Mar. 10, 2005

(65) Prior Publication Data
US 2006/0117305 A1   Jun. 1, 2006

(30) Foreign Application Priority Data
Nov. 25, 2004   (FI) .................................. 20041517

(51) Int. Cl.
*G06F 9/45* (2006.01)
(52) U.S. Cl. ..................................... 717/139
(58) Field of Classification Search ................ 717/114, 717/139–140, 162
See application file for complete search history.

(56) References Cited

U.S. PATENT DOCUMENTS

| 5,974,549 | A | | 10/1999 | Golan | 713/200 |
| 6,044,467 | A | | 3/2000 | Gong | 713/200 |
| 6,088,801 | A | * | 7/2000 | Grecsek | 726/1 |
| 6,321,334 | B1 | * | 11/2001 | Jerger et al. | 726/1 |
| 6,754,889 | B1 | * | 6/2004 | Leverenz | 717/127 |
| 2002/0083416 | A1 | * | 6/2002 | Click et al. | 717/120 |
| 2002/0104077 | A1 | * | 8/2002 | Charnell et al. | 717/162 |
| 2002/0108106 | A1 | * | 8/2002 | Kramskoy et al. | 717/148 |
| 2002/0112227 | A1 | * | 8/2002 | Kramskoy et al. | 717/148 |
| 2002/0184520 | A1 | * | 12/2002 | Bush et al. | 713/200 |
| 2003/0093660 | A1 | | 5/2003 | Safa | 713/1 |
| 2004/0039926 | A1 | | 2/2004 | Lambert | 713/189 |

OTHER PUBLICATIONS

Zhang et al. "Adaptive Code Unloading for Resource-Constrained JVMs", Jul. 2004, ACM SIGPLAN Notices vol. 39 Issue 7, pp. 155-164.*
Attardi, "CodeBricks: Code Fragments as Building Blocks", Jun. 2003, ACM, pp. 66-74.*

* cited by examiner

*Primary Examiner*—Wei Y. Zhen
*Assistant Examiner*—Anna Deng

(57) ABSTRACT

The invention relates to method for secure interpretation of a program in an electronic device. An interpreted program is loaded and a stub executable is formed using a prototype stub executable. The stub executable is associated with the interpreted program. At least one second capability also is assigned to the interpreted program and further to the stub executable. The stub executable invokes at least one function in a shared interpreter library to interpret the interpreted program. An interpreter engine checks whether the interpreted program refers an external interpreted program code section. The interpreter engine infers at least one second capability for the external interpreted program code section. The interpreter engine disallows the execution of said external interpreted program code section if said at least one first capability is not a subset of said at least one second capability.

23 Claims, 4 Drawing Sheets

METHOD FOR THE SECURE INTERPRETATION OF PROGRAMS IN ELECTRONIC DEVICES

CROSS REFERENCE TO PRIORITY DOCUMENT

This application claims priority from prior U.S. patent application Ser. No. 10/996,801 filed Nov. 24, 2004.

BACKGROUND OF THE INVENTION

1. Field of the Invention

The invention relates to interpreted programming languages. Particularly, the invention relates to a method for the secure interpretation of programs in electronic devices.

2. Description of the Related Art

Security is an important factor in electronic communication devices. Nowadays mobile terminals have evolved from simple cellular telephones into multi-purpose communicator devices with applications similar to personal computers. The communicator devices come with a wide variety of services such as Internet browsing, E-mail and multimedia calls. One important technology, which is making its way to mobile terminals are various interpreted languages such as Java, Perl, PHP and Python. These interpreted language further increase the plethora of value-added services and games available in mobile terminals. The software developed using these interpreted languages comprises separate programs and shared libraries. These programs and libraries may be downloaded over the air from a network server to a mobile terminal. The downloading of software mostly occurs by means of a browser provided in the mobile terminal. It is important for the user to be able to trust the applications he or she downloads from the network. It is very easy to sneak malicious code into the mobile terminal, unless proper security procedures are applied in the mobile terminal. In a mobile terminal malicious code may cause a variety of nuisances. For example, calls may be set-up to chargeable service numbers without properly informing the user, information may be gathered and stolen from the mobile terminal, and chargeable purchases may be made on behalf of the user, if the mobile terminal supports some kind of mobile payment system.

History shows several examples of malicious programs that have been written using interpreted languages running within an interpreter on another platform. These malicious programs have either targeted the interpreted environment, the host environment or both. The malicious programs operation was feasible because the interpreter's runtime environment did not provide sufficient isolation from other interpreted programs or the host platform.

Application isolation in the context of this patent application is defined as the separation of the persistent state and runtime behavior of the programs. Programs may voluntarily share their data or react to the behavior of other programs.

Modern features familiar to an expert in the field include data caging, runtime isolation of processes, capability framework, process identifiers, Inter-Process Communication (IPC) authentication, trusted computing base, perimeter defense and software installation programs of operating systems.

These features together isolate programs from each other, from the trusted computing base and from sensitive system interfaces. A noteworthy feature in contemporary operating systems is that the policy is enforced at the process boundary and as such the system is based on the isolation of processes and hence programs. The trusted computing base also denies programs the ability to increase their privileges.

A secure kernel isolates native programs from each other. This implies that it is not possible to grant capabilities or access to resources to programs that are not isolated from each other. If it would be possible to grant capabilities to applications that were not isolated from each other then there would be no guarantees that the capabilities do not "leak" to malicious code. Essentially, the isolation of applications is a critical underpinning of the capability framework.

The security features mentioned above are instrumental in preventing the damage a malicious or defective program may do to the platform, to data or to other programs on the system. These features have been designed so that application isolation is provided for native programs. The system specifications do not at the moment suggest how application isolation would be provided for interpreted programs. This invention proposes a method by which this is achieved.

SUMMARY OF THE INVENTION

The invention relates to a method for the secure interpretation programs in an electronic device. The method comprises: providing at least one shared interpreter library and a prototype stub executable in said electronic device, loading an interpreted program in said electronic device, forming a stub executable using said prototype stub executable in said electronic device, associating said stub executable with said interpreted program in said electronic device, assigning at least one second capability to said stub executable, and executing said stub executable in said electronic device.

The invention relates also to an electronic device comprising: at least one shared interpreter library configured to implement an interpreter engine, an installer entity configured to load an interpreted program in said electronic device, to form a stub executable using a prototype stub executable, to assign at least one second capability to said stub executable, to associate said at least one second capability to said stub executable, and an operating system entity configured to execute said stub executable.

The invention relates also to a computer program comprising code adapted to perform the following steps when executed on a data-processing system: loading an interpreted program, forming a stub executable using a prototype stub executable, associating the stub executable with the interpreted program, assigning at least one second capability to the interpreted program, associating the at least one second capability to the stub executable, executing the stub executable, the stub executable indicating to at least one shared interpreter library the interpreted program, and the stub executable invoking at least one function in the shared interpreter library to interpret the interpreted program.

The invention relates also to a computer program comprising code adapted to perform the following steps when executed on a data-processing system: providing at least one capability associated with said computer program to an interpreted program, obtaining information on an interpreted program from a secure source assigned to said computer program, indicating to at least one shared interpreter library said interpreted program, said at least one shared library comprising at least one function implementing an interpreter engine for interpreting interpreted program code, and invoking at least one function in said shared interpreter library to interpret said interpreted program.

In one embodiment of the invention, the method further comprises: the stub executable indicating to said at least one shared interpreter library said interpreted program, the stub executable invoking at least one function in said at least one shared interpreter library to interpret said interpreted program, checking whether an external interpreted program code section is referred by the interpreted program, inferring at least one first capability for said external interpreted program code section; and disallowing the execution of said external interpreted program code section if said at least one second capability is not a subset of said at least one first capability.

In one embodiment of the invention, the at least one shared interpreter library is further configured to check whether an external interpreted program code section is referred by an interpreted program, to infer at least one first capability for said external interpreted program code section, and to disallow the execution of said external interpreted program code section if at least one second capability is not a subset of said at least one first capability.

In one embodiment of the invention, the secure source is a secure directory in an electronic device. The secure source may, for example, be the computer program code itself or it may be the directory storing the computer program. The information on the interpreted program may be the file name of the interpreted program. The secure source may also be the operating system, which provides to the computer program the filename of the file comprising the computer program.

It should be noted that the term external interpreted program code section refers to an interpreted program code section that is obtained outside of the interpreted program itself, for example, from a directory different than the one reserved for the interpreted program in the electronic device. For example, the external interpreted program code section may be read from a shared interpreted library. An external interpreted program code section may also be obtained over-the-air during the interpretation of the interpreted program. The term at least one first capability refers to the set of capabilities assigned to the external interpreted program code section, for example, a shared interpreted library. The term at least one second capability refers to the set of capabilities of the stub executable. It should be noted that a single capability might comprise a number of individual operating system, data communication or electronic device management related operations or functions. In other words, a number of functions may have been grouped in a single capability for convenience reason. A program or a piece of program code can have associated with it a set of capabilities. A capability grants access to a resource or function in the electronic device that would be otherwise unavailable to said program or program code. The capabilities are policed by the operating system or the functions serving said program in the electronic device.

In one embodiment of the invention, a reliability category is determined for an interpreted program code section based on at least one of the location of a file comprising the interpreted program code section in the file system of the electronic device and whether the interpreted program code section has been received from a trusted remote sender, and the trust level is granted based the reliability category.

In one embodiment of the invention, the execution of arbitrary data is disabled in the at least one interpreter library. This means, for example, that the functions for the execution of arbitrary data are made inaccessible for the interpreter engine. The attempt to call such a function causes an error to be generated in the interpreter engine. In one embodiment of the invention, the stub executable is executed in a separate process context. The disabling may be performed beforehand as the interpreter engine is compiled to produce the at least one shared interpreter library. This disabled version is then provided to the electronic device.

In one embodiment of the invention, the external interpreted program code section is loaded in said electronic device, for example, over-the-air from a network server. In one embodiment of the invention, the external interpreted program code section is a function within a shared interpreted library comprising interpreted program code. The external interpreted program code section may also be formed from arbitrary data by the interpreted program so that the interpreted program code is passed by the interpreted program itself to the interpreter engine.

In one embodiment of the invention, a trust level is granted to the shared interpreted library. The trust level may be granted by the user or by the installer entity automatically. If the installer entity grants the trust level automatically, it may be obtained by inspecting trust level information provided by a network server. The operator may have signed the trust level information. The signing may also have been performed by a service provider or any other trusted entity. The trust level is used to determine the at least one first capability either in the operating system entity level or in the installer entity level.

In one embodiment of the invention, the loading of the interpreted program comprises the downloading of the interpreted program from a network server.

In one embodiment of the invention, the providing of the at least one shared interpreter library and the prototype stub executable comprises the downloading of them from a network server to the electronic device.

In one embodiment of the invention, the loading of the at least one shared interpreted library comprises the downloading of them from a network server to the electronic device.

In one embodiment of the invention, the interpreted program is identified using a unique identifier in the electronic device. The unique identifier may be used, for example, by the operating system entity and the installer entity to refer to the interpreted program and the stub executable. The at least one second capability may be associated by the operating system entity with the unique identifier.

In one embodiment of the invention, the electronic device comprises a mobile terminal. In one embodiment of the invention, the electronic device comprises a SYMBIAN™ operating system device. In one embodiment of the invention, the electronic device comprises a General Packet Radio System terminal or a Universal Mobile Telecommunications System terminal.

In one embodiment of the invention, the computer program is stored on a computer readable medium. The computer readable medium may be a removable memory card, magnetic disk, optical disk or magnetic tape. In one embodiment of the invention, the electronic device is a mobile device, for example, a laptop computer, a palmtop computer, a mobile terminal or a personal digital assistant (PDA). In one embodiment of the invention, the electronic device is a desktop computer or a mainframe computer.

The benefits of the invention are related to the improved reliability of loaded interpreted programs. The invention enables the capabilities defined for executable programs in the native operating system to be applied for interpreted programs and program code per program or program code that are executed within an interpreter which otherwise would be seen as a single arbitrary application in the native operating system with a single set of capabilities.

BRIEF DESCRIPTION OF THE DRAWINGS:

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS:

Reference will now be made in detail to the embodiments of the present invention, examples of which are illustrated in the accompanying drawings.

Figure 1:
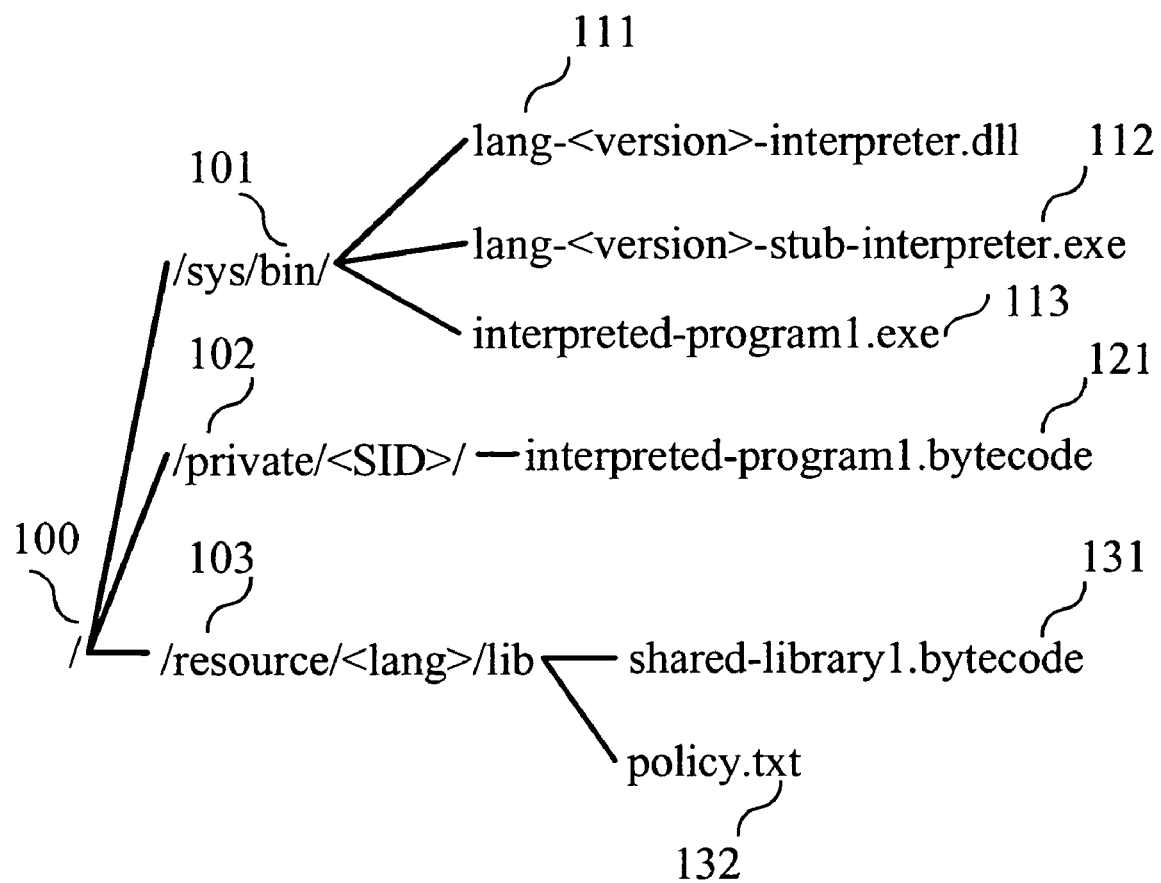
FIG. 1 is a block diagram illustrating an example of a directory tree in an electronic device according to the invention.
Figure 3:
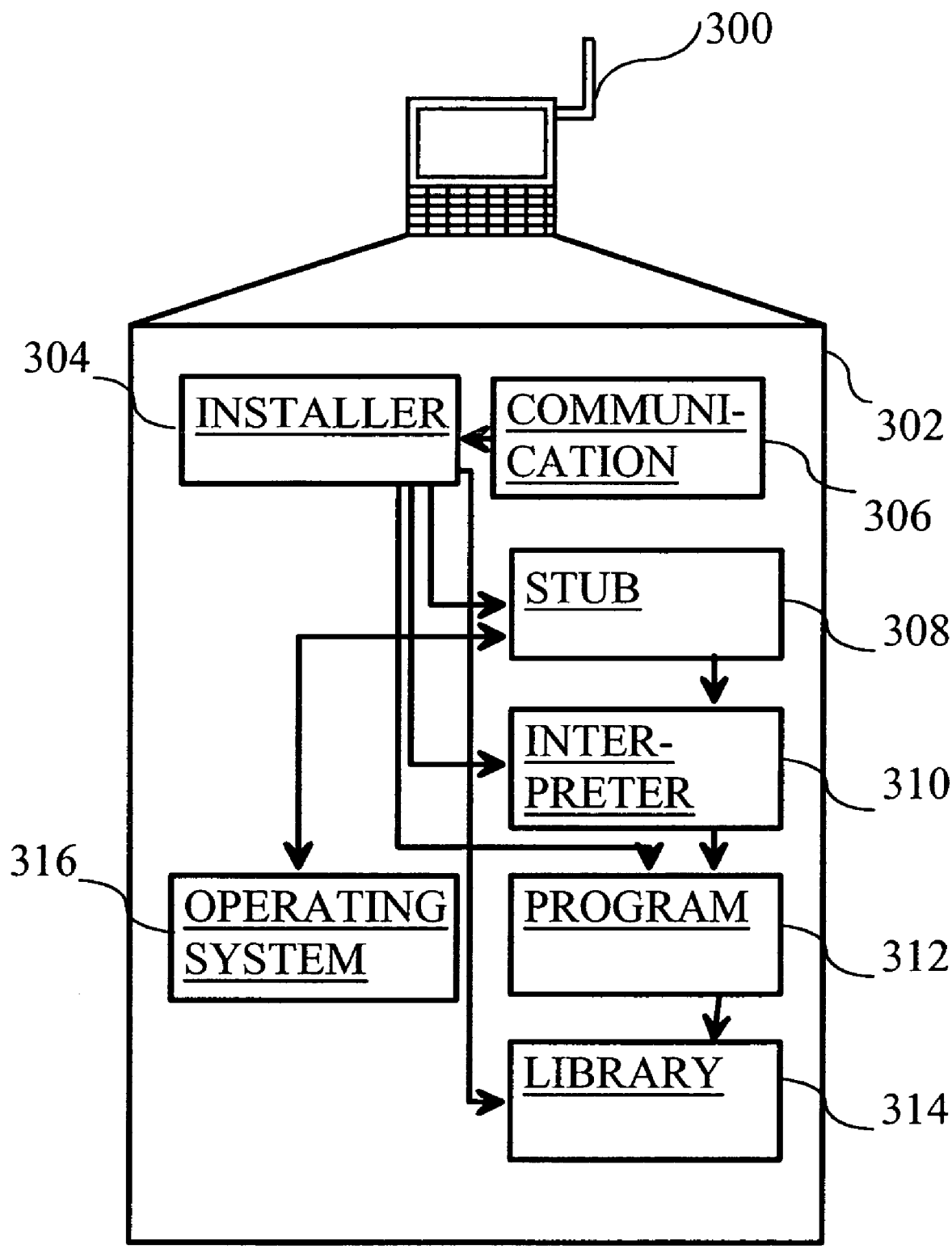
FIG. 3 is a block diagram illustrating an electronic device according to the invention.

FIG. 1 is a block diagram illustrating an example of a directory tree in an electronic device according to the invention. The electronic device is as illustrated in FIG. 3. In one embodiment of the invention the electronic device is a SYMBIAN™ operating system device. The directory tree illustrates what files essential to the method are stored in an electronic device according to the invention and what their mutual relationships are. In FIG. 1 there is a root node 100, to which subdirectories 101, 102 and 103 are connected. The subdirectory 101 stores binary files, which implement an interpreter. The interpreter may be, for example, a Java interpreter, a Perl interpreter, a PHP interpreter or a Python interpreter. In subdirectory 101 there are files 111, 112 and 113. File 111 comprises the engine for an interpreter, which executes either directly the program source code or a byte code that has been produced using a compiler. The program source code or the byte code that is interpreted by the interpreter engine is hereinafter referred to as the interpreted program code. The compiler takes a human readable source code and compiles it into a byte code. However, it should be noted that the byte code might be any intermediate language, which may be executed by the interpreter engine. The intermediate language may be in any format optimal for machine execution. It does not necessarily have to comprise operation codes of the size of one byte. In essence file 111 is a Dynamically Linked Library (DLL), which comprises functions for the execution of the interpreter engine. File 112 is a stub interpreter executable, which when executed, invokes eventually the interpreter engine placed in file 111. File 113 is formed by means of file 112 whenever an interpreted program is installed to the electronic device.

A subdirectory 102 comprises a program, which is to be interpreted using the interpreter engine. Subdirectory 102 comprises a file 121, which comprises the interpreted program. The component <SID> in the subdirectory name represents a Security Identifier (SID), which has been assigned to the interpreted program. The SID identifies uniquely the interpreted program and enables capabilities be assigned to the interpreted program. A capability represents an operating system function or a set of operating system functions that may be invoked by an application identified using a SID. Examples of capabilities include the capability to set-up and communicate over a remote network, for example, to a remote Internet server, and the capability to access files stored on the electronic device. A single capability may comprise a number of related functions and operations. For example, all IP socket related functions might comprise a single capability. Other capabilities may relate to power management, local communication over BLUETOOTH™ or infrared and low-level radio protocol operations.

A subdirectory 103 comprises a shared library, which comprises functions that are to be invoked from interpreted programs such as the interpreted program stored in file 121. The shared library is stored in a file 131. Subdirectory 132 comprises also a policy file, which governs the policies how the shared library is managed in the electronic device. The policy file would define how to manage the /resource/<lang> directory and how to create the lang-<version->-stub-interpreter-.exe for bootstrapping the interpreter for a certain script. The advantage of using a policy definition file is that no interpreter-specific foreign code is executed in the context of the software installation program. The policies of all interpreters can also be cross-referenced and checked for errors and conflicts before they are implemented. The policy support required in this case is also extremely simple. The shared interpreted library is assigned a trust level, in other words, a set of capabilities that are allowed for the functions in the library. The set of capabilities are either operator determined or user determined. In the case of operator determination, the capabilities are indicated to the electronic device as the file is downloaded from a network server. The capabilities are verified, for example, so that they are signed using the operator's digital signature. In the case of user determination, the user is prompted to indicate what capabilities are to be allowed for the library. The capabilities assigned to the shared interpreted library should reflect what functionalities have been tested and are thus considered reliable in the case of the library. For example, a library may be considered safe to download files to the electronic device, but may not be allowed to read files in the electronic device.

Figure 2A:
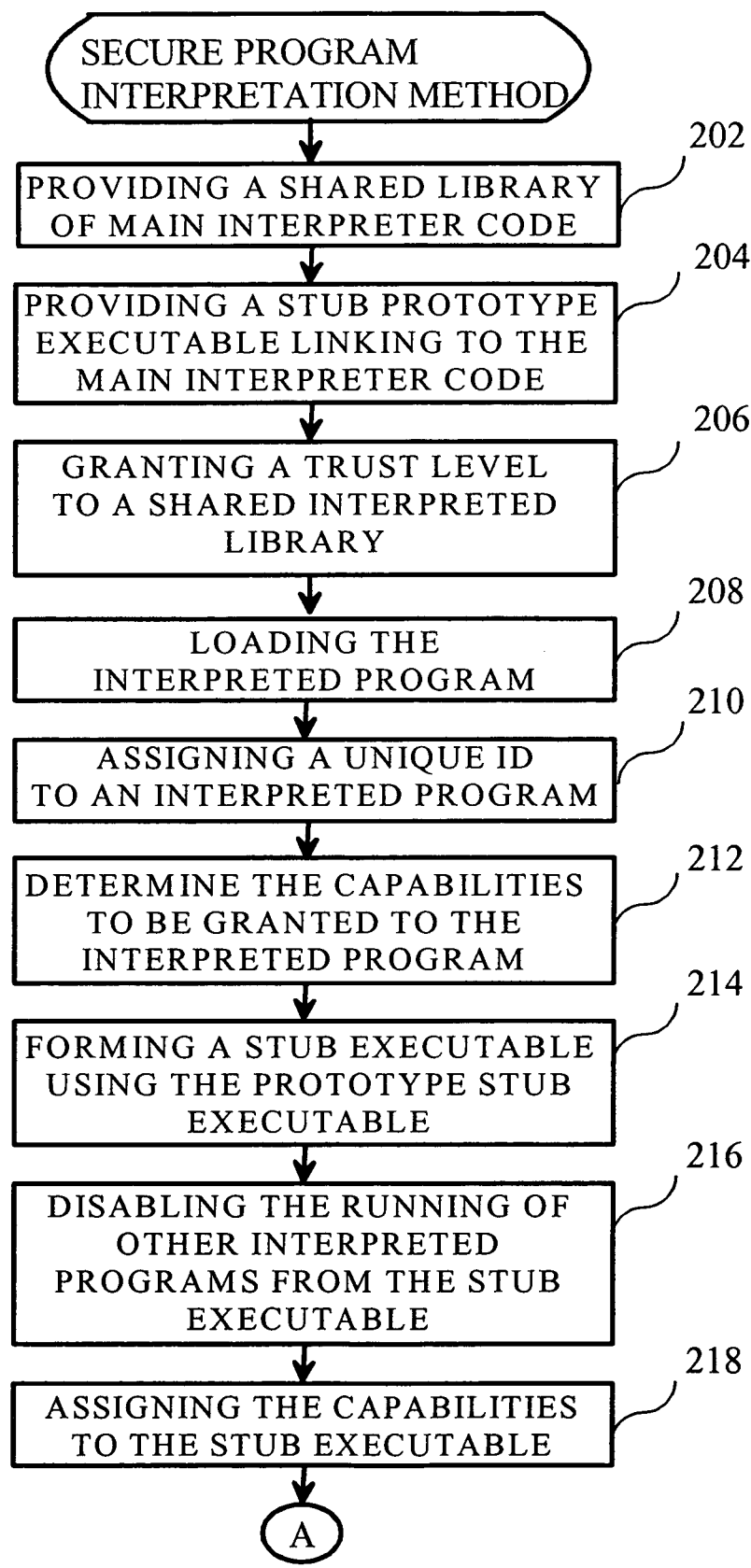
FIG. 2A and FIG. 2B are a flow chart illustrating the method for the secure interpretation of programs in one embodiment of the invention.
Figure 2B:
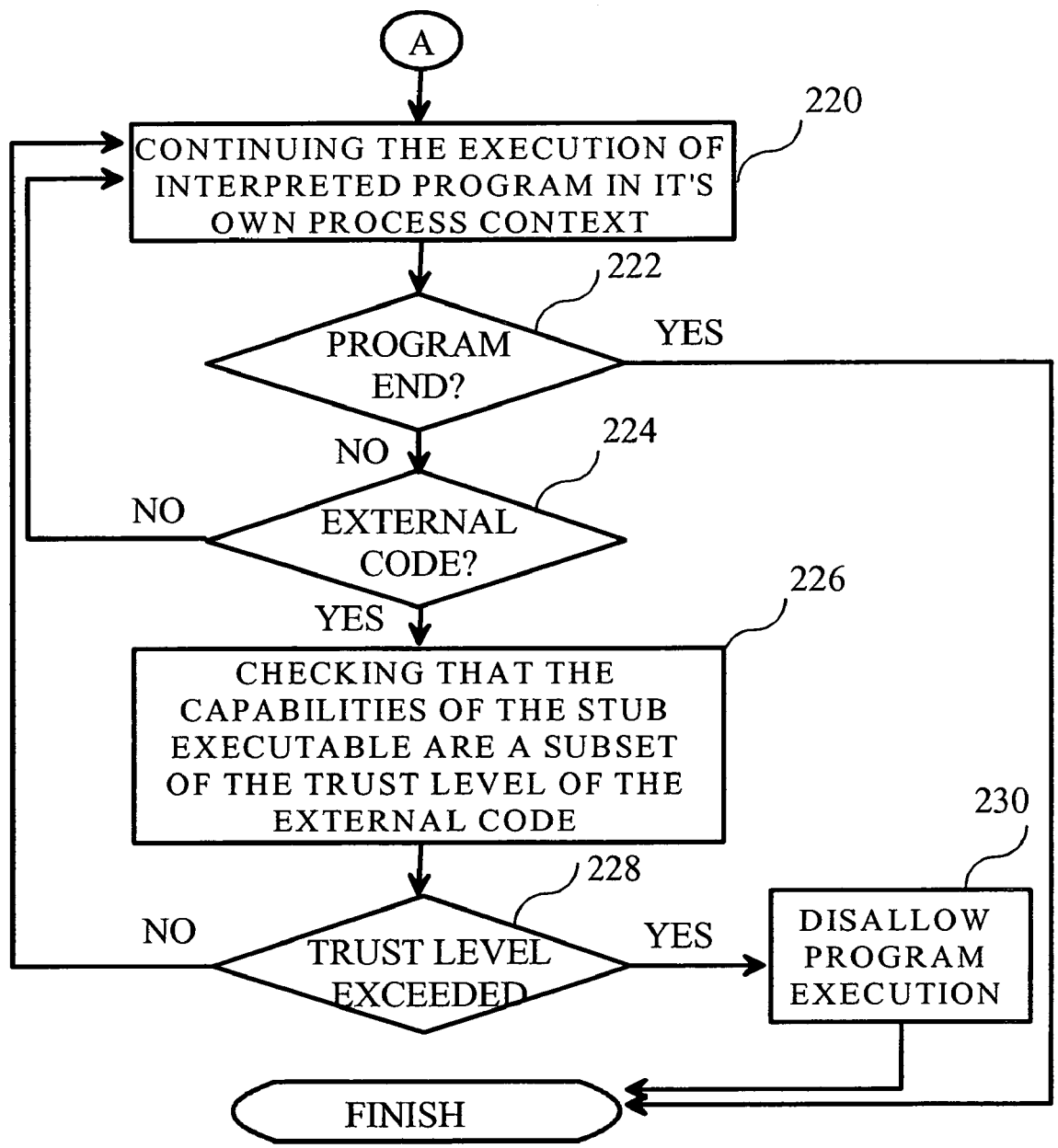

FIGS. 2A and 2B are a flow chart illustrating the method for the secure interpretation of programs in one embodiment of the invention.

At step 202 a shared interpreter library comprising the main interpreter code, that is, the interpreter engine is provided to the electronic device. The shared library may be provided, for example, as part of the native operating system or it may be downloaded over the air to the electronic device from a network server as the user requests the downloading of the interpreter.

At step 204 a prototype stub executable comprising the functions necessary to invoke the interpreter engine for the interpretation of a single interpreted program is provided to the electronic device. The prototype stub executable may be provided, for example, as part of the native operating system or it may be downloaded over the air to the electronic device as the user requests the downloading of the interpreter from the network server. The installation of the shared interpreter library, comprising the main interpreter code, and the prototype stub executable may be performed in a separate installer entity, which stores them to a non-volatile memory in the electronic device.

In one embodiment of the invention, a shared interpreted library is also loaded to the electronic device. The shared library may be loaded to the electronic device using a removable memory medium such as a magnetic or optical disk or a removable memory card or it may be downloaded over the air to the electronic device. The installation of the shared interpreted library may be performed in a separate installer entity, which stores it to a non-volatile memory in the electronic device.

Optionally, at step 206 a trust level is granted to a shared interpreted library in the electronic device. The trust level specifies a set of capabilities assigned to the shared interpreted library. The granting decision may be based on trust level information signed by the operator or any other entity trusted by the electronic device. The trust is established, for example, by means of Public Key Infrastructure (PKI) and trust chains. The user of the electronic device may also explicitly specify the granting decision via the user interface of the electronic device.

At step 208 the interpreted program is loaded to the electronic device. The interpreted program is, for example, downloaded over the air. The interpreted program may have been selected by the user from a WWW-page or a WAP-page. The interpreted program is downloaded, for example, from a network server to which the electronic device has established a connection. The installing of the interpreted program may be performed by an installer entity. In one embodiment of the invention, the interpreted program may also be loaded to the electronic device using a removable memory medium such as a magnetic or optical disk or a removable memory card.

At step 210 a unique identifier is assigned to the interpreted program. The interpreted program may use functions in the shared library that may have been downloaded to the electronic device. The unique identifier is obtained from an authority, which is responsible for allocating unique identifiers for applications executed in the electronic device.

At step 212 the capabilities to be granted to the interpreted program are determined in the electronic device. For example, the capabilities are determined by analyzing the interpreted program code of the interpreted program or they may be specified in a separate file or data structure provided in association with the interpreted program from the network server or from a removable memory medium. There may also be interpreted programs for which no capabilities are granted. In such as case the interpreted program is merely allowed to render information to the display and to interact with the user using the keyboard.

At step 214 a stub executable is formed using the prototype stub executable. The stub executable is formed for invoking the interpreter engine and for determining the interpreted program to the interpreter engine. The stub executable is formed using the prototype stub executable. The stub executable may be formed using instructions provided in a separate policy file, which is provided, for example, in association with the shared interpreted library or in association with the interpreted program. The forming of stub executable may be performed by an installer entity.

At step 216 the running of other programs from the stub executable is disabled. The disabling is achieved, for example, so that the stub executable explicitly indicates to the interpreter engine the interpreted program that is to be executed. The interpreted program is indicated, for example, by providing its filename such as file 121 in FIG. 1.

At step 218 the capabilities determined for the interpreted program are assigned to the stub executable formed at step 214 in the electronic device. The stub executable will represent the interpreted program for the operating system security functions. Due to the fact that the stub executable is used to invoke the interpreter engine and to provide the interpreted program to the interpreter engine it is ensured that no other interpreted program code than the interpreted program or functions in the shared interpreted library are executed. In other words, there is no other possibility for interpreted programs to get executed in the interpreter engine than via a stub executable.

The label "A" represents the point where the method illustrated in FIG. 2A continues in FIG. 2B.

At step 220 the process in charge of interpreting the interpreted program by means of the stub executable and the interpreter engine is executed in a separate process context by the operating system of the electronic device. For each interpreted program there is a separate process context.

At step 222 it is checked by the interpreter engine whether the program is at end. If the program is not at end, the method continues at step 224.

At step 224 it is checked by the interpreter engine whether external interpreted program code is to be interpreted by it. If this is the case, method continues at step 226, otherwise the method continues at step 220. An example of an external interpreted program code is code included in a shared interpreted library. Another example of an external interpreted program code is code that has been received to the electronic device during the interpretation of the current code.

At step 226 the trust level of the external interpreted program code is compared to the capabilities of the stub executable by the interpreter engine. It is determined that the capabilities of the stub executable are a subset of the capabilities associated with the trust level of the external interpreted program code, that is, for example, the shared interpreted library. A given trust level uniquely specifies the set of capabilities that has been assigned to an external interpreted program code. The trust level is inferred, for example, based on the location of the external interpreted program code in the electronic device file system. For example, if the code is located in a trusted directory such as the directory of the interpreted program or a language specific trusted directory, it is granted at least the capabilities of the interpreted program. If the capabilities of the stub executable are not a subset of the capabilities associated with the trust level, in other words, the stub executable has capabilities not belonging to the set of capabilities specified for the external interpreted program code, the interpreter engine considers the trust level to be exceeded.

At step 228 the interpreter engine checks, if the trust level was exceeded. If it was exceeded, the method continues at step 230. Otherwise the method continues at step 220.

At step 230 the interpreter engine disallows the program execution. The user may be provided with an appropriate error message and the execution of the stub executable is terminated.

FIG. 3 is a block diagram illustrating an electronic device 300 according to the invention. Electronic device 300 comprises a first memory (not shown) and a second memory (not shown). The first memory is a volatile RAM work memory and the second memory is a non-volatile memory. In one embodiment of the invention the first and the second memories are the same memory, which is non-volatile. The electronic device also comprises a processor (not shown).

In FIG. 3 there is a box 302, which illustrates the software in the electronic device. The software comprises at least an operating system entity 316, an installer entity 304 and a communication entity 306. The software may also comprise an interpreter engine 310 and a stub executable 308 associated with interpreter engine 310. Interpreter engine 310 executes the interpreted program codes for interpreted programs such as interpreted program 312. The interpreted programs may use at least one function stored in a shared library 314. Shared library 314 comprises functions specified in the interpreted program code executed by interpreter engine 310. Shared library 314 may also comprise functions specified in the native machine code of the electronic device. Stub executable 308 is used to invoke an instance of a given interpreted program in interpreter engine 310. No other interpreted programs may be invoked in interpreter engine 310 using the same stub executable. Communication entity 306 performs the communication related tasks in the electronic device. It comprises the protocol stacks that are used for the radio interface communication and in the communication with a remote network such as the Internet. When communication entity 306 receives interpreted program 312 from the remote network, it is provided to an installer entity 304. Installer entity 304 stores interpreted program 312 to electronic device non-volatile memory. Installer entity 304 creates a stub executable specific to interpreted program 312. In one embodiment of the invention, installer entity uses a policy file in the forming of the necessary files as interpreted program 312 is installed to the non-volatile memory in electronic device 300. Installer entity 304 may also be responsible for the installing and configuring of shared library 314 in non-volatile memory when it is downloaded to electronic device 300. Similarly, installer entity may also be responsible for the installing and configuring of interpreter engine 310 and a prototype stub in non-volatile memory when the interpreter is downloaded to electronic device 300. Operating system entity 316 or installer entity 304 may be responsible for the assigning of trust levels and capabilities to shared libraries and interpreted programs. In one embodiment of the invention, installer entity 304 is an application executed within electronic device 300. In one embodiment of the invention, stub executable 308 is an application executed within electronic device 300 under operating system entity 316. Interpreter engine 310 is a dynamically linked library in the native machine code of electronic device 300. Functions are invoked by stub executable 308 from the dynamically linked library.

In the following text is described one embodiment of the invention, where the method of the invention is applied in a SYMBIAN™ operating system environment. The importance of isolating interpreted applications from each other and the host platform is relative to the importance of the data manipulated and the functionality provided by these interpreted programs. If only one program is implemented for an interpreter then application isolation is performed implicitly.

A case where application isolation becomes critical is when a majority of the applications is implemented using a single interpreter. A significant amount of the platform security work would be left redundant if the interpreter did not apply platform security correctly. This could leave a malicious program the ability to target the valuable data of other interpreted programs.

The Microsoft macrovirus problem is an example of a worst-case of what the extent of the problem could be. It does not matter if the underlying operating system is secure if the environments the programs run in are not (e.g. Word, Excel).

The integration means that the significant aspects of the syntax and semantics of the operating system platform security are provided to the interpreted program. The following features are required: an interpreted program must have a unique identification, an interpreted program must have its own private directory, shared code libraries must have trust levels and the trust levels must be managed like individual programs, an interpreted program must have a capability set assigned to it, each interpreted program must execute in separate process contexts, and an interpreted program must be limited by its capability set.

The suggested method for implementing these is based on the following. The main ideas are as follows: placing an interpreter executable in a DLL /sys/bin/lang-<version->interpreter.dll (the <version> part denotes the version of the interpreter), creating a stub executable /sys/bin/lang-<version>-stubinterpreter.exe (the <version> part denotes the version of the interpreter), for each interpreted program is assigned a SID/VID pair as for any other program, the interpreted program files are placed in the directory /private/<SID>/, for each interpreted program X the /sys/bin/lang-<version->stub-interpreter.exe is copied to /sys/bin/interpreted-program-X.exe and the interpreted-program-X is assigned the capabilities X is to have, the stub-interpreter would always execute a designated program from its private directory, a general purpose shared code is placed in /resource/<lang>/lib, any required native DLLs are placed in /sys/bin, and a file dictating the policy to be used for managing shared code is placed under /resource/<lang>/policy.txt.

This solution essentially maps interpreted programs onto the native operating system platform security in such a manner that they will seem as native operating system programs. An additional benefit is that it keeps the user experience similar to the case when capabilities are assigned to a native program. This solution does not yet address how to assign trust levels to shared code. This is discussed in the next section.

The proposed design does not outright solve how trust levels are assigned to individual pieces of code external to the interpreted program. The problem is troublesome for the following reasons. Most interpreted languages provide access to the interpreter from within the language (e.g. in Perl or Python via the eval( ) function). Therefore any I/O source can be used to provide ready-to-run code (this is actually true for native programs also, but the presence of such code would deny certification).

Based on monitoring the external I/O of an interpreter one cannot deduce what input data is used as code and what as data.

Using the stub interpreter exe provides a neat way to attach capabilities to programs, but there is no easy way to attach capabilities to arbitrary input using the existing operating system mechanisms.

Based on the above it is clear that any sane mechanism for attaching trust levels for general purpose code requires support from the actual interpreter. There are two options available for this: denying the loading/running code that would cause not trusted code to be run with capabilities, the introduction of lower capabilities at runtime based on what source the code came from.

Adjusting capabilities at runtime may require changes to the operating system kernel. A compromise solution is to require interpreters with capabilities to disable loading and running code from other sources than the scripts private directory.

For shared code libraries in /sys/resource SID/VID values are not assigned. SID/VID values are only assigned to binaries under /sys/bin. A policy file format is defined that describes how to manage the interpreted program code that is shared between interpreted programs. The policy file would define the following:

How to manage the /sys/resource/<lang>directory;
How to create the lang-<version->-stub-interpreter.exe for bootstrapping the interpreter for a certain script.

The directory /sys is a directory in which only the installer entity may write. But every program can read that directory. The directories /private/<SID> are directories, which may only be read by the installer entity or the program, which resides in that directory. The principle that the electronic device has these two type of directories is essential, not the actual names of the directories.

The advantage of using a policy definition file is that no interpreter-specific foreign code is executed in the context of the SWInstall, that is, the software installation program. The policies of all interpreters can also be cross-referenced and checked for errors and conflicts before they are implemented. The policy support required in this case is also extremely simple.

The interpreters should have the following features implemented into them:

The default directory used within the scripts is /private/<SID>. If files are to be globally readable/writable, then this must be declared explicitly.

Running code external to the private directory and the /sys/resource directory is disabled if the program has been granted ANY capabilities (including User capabilities). One may wish to have a special "developer-switch" that disables this feature.

If User-capabilities have been granted then program code can only be loaded from the programs private directory and the shared code directory.

If System-capabilities have been granted then program code can only be loaded from the programs private directory.

It will be evident to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   providing at least one shared interpreter library and a prototype stub executable in an electronic device;
   loading an interpreted program in said electronic device;
   forming a stub executable using said prototype stub executable in said electronic device, said stub executable being an application executed within an operating system in said electronic device;
   associating said stub executable with said interpreted program in said electronic device;
   assigning at least one second capability to said stub executable;
   executing said stub executable in said electronic device in a separate process context;
   indicating, by said stub executable, to said at least one shared interpreter library said interpreted program;
   invoking, by said stub executable, at least one function in said at least one shared interpreter library to interpret said interpreted program;
   checking whether an external interpreted program code section is referred by the interpreted program;
   loading said external interpreted program code section in said electronic device;
   inferring at least one first capability for said external interpreted program code section; and
   disallowing the execution of said external interpreted program code section if said at least one second capability is not a subset of said at least one first capability.

2. The method according to claim 1, wherein said loading of said interpreted program code section comprises downloading it from a network server to said electronic device.

3. The method according to claim 2, the method further comprising:
   granting a trust level to said external interpreted program code section; and
   determining the said at least one first capability based on said trust level.

4. The method according to claim 3, the method further comprising:
   determining a reliability category for an interpreted program code section based on at least one of a location of a file comprising said interpreted program code section in a file system of said electronic device and whether said interpreted program code section has been received from a trusted remote sender; and
   granting said trust level based said reliability category.

5. The method according to claim 1, wherein said loading of said interpreted program comprises the downloading of said interpreted program from a network server.

6. The method according to claim 1, wherein said providing of said at least one shared interpreter library and said prototype stub executable comprises downloading them from a network server to said electronic device.

7. The method according to claim 1, wherein said interpreted program is identified using a unique identifier in said electronic device.

8. The method according to claim 1, wherein said electronic device is a mobile terminal.

9. The method according to claim 1, wherein said electronic device is a SYMBIAN™ operating system device.

10. The method according to claim 1, wherein said electronic device is a General Packet Radio System terminal or a Universal Mobile Telecommunications System terminal.

11. An electronic device comprising:
    at least one shared interpreter library configured to implement an interpreter engine, to check whether an external interpreted program code section is referred by an interpreted program, to infer at least on first capability for said external interpreted program code section, and to disallow the execution of said external interpreted program code section, if at least on second capability is not a subset of said at least one first capability;
    an installer entity configured to load said interpreted program in said electronic device, to form a stub executable using a prototype stub executable, to associate said stub executable with said interpreted program, to assign said at least one second capability to said stub executable, said stub executable being an application executed within an operating system in said electronic device, and to load said external interpreted program code section in said electronic device; and
    an operating system entity configured to execute said stub executable in a separate process context.

12. The electronic device according to claim 11, wherein said loading of said at least one interpreted program code section comprises downloading it from a network server to said electronic device.

13. The electronic device according to claim 11, wherein said at least one shared interpreter library is further configured to grant a trust level to said external interpreted program code section and to determine the said at least one first capability based on said trust level.

14. The electronic device according to claim 11, wherein said loading of said interpreted program comprises downloading said interpreted program from a network server.

15. The electronic device according to claim 11, wherein said installer entity is further configured to download said at least one shared interpreter library and said prototype stub executable from a network server to said electronic device.

16. The electronic device according to claim 11, wherein said operating system entity is further configured to identify said interpreted program using a unique identifier.

17. The electronic device according to claim 11, wherein said electronic device is a mobile terminal.

18. The electronic device according to claim 13, wherein said electronic device is a SYMBIAN™ operating system device.

19. The electronic device according to claim 11, wherein said electronic device is a General Packet Radio System terminal or a Universal Mobile Telecommunications System terminal.

20. A computer program embodied on a computer readable medium, the computer program comprising code for controlling a processor to execute a method comprising:
   loading an interpreted program;
   forming a stub executable using a prototype stub executable, said stub executable being an application executed within an operating system in an electronic device;
   associating said stub executable with said interpreted program;
   assigning at least one second capability to said interpreted program;
   associating said at least one second capability to said stub executable;
   executing said stub executable in separate process context;
   indicating by said stub executable to at least one shared interpreter library said program;
   invoking by said stub executable at least one function in said shared interpreter library to interpret said interpreted program;
   checking whether an external interpreted program code section is referred by the interpreted program;
   loading said external interpreted program code section in said electronic device;
   inferring at least one first capability for said external interpreted program code section; and
   disallowing the execution of the said external interpreted program code section if said at least one second capability is not a subset of said at least one first capability.

21. The computer readable medium according to claim 4, wherein said computer readable medium is a removable memory card.

22. The computer readable medium according to claim 4, wherein said computer readable medium is a magnetic or an optical disk.

23. An electronic device comprising:
   means for providing at least one shared interpreter library and a prototype stub executable in said electronic device;
   means for loading an interpreted program in said electronic device;
   means for forming a stub executable using said prototype stub executable in said electronic device, said stub executable being an application executed within an operating system in said electronic device;
   means for associating said stub executable with said interpreted program in said electronic device;
   means for assigning at least one second capability to said stub executable;
   means for executing said stub executable in said electronic device in a separate process context;
   means for indicating, by said stub executable, to said at least one shared interpreter library said interpreted program;
   means for invoking, by said stub executable, at least one function in said at least one shared interpreter library to interpret said interpreted program;
   means for checking whether an external interpreted program code section is referred by the interpreted program;
   means for loading said external interpreted program code section in said electronic device;
   means for inferring at least one first capability for said external interpreted program code section; and
   means for disallowing the execution of said external interpreted program code section if said at least one second capability is not a subset of said at least one first capability.

\* \* \* \* \*

UNITED STATES PATENT AND TRADEMARK OFFICE
CERTIFICATE OF CORRECTION

PATENT NO. : 7,444,624 B2  
APPLICATION NO. : 11/077663  
DATED : October 28, 2008  
INVENTOR(S) : Lauri Tarkkala Page 1 of 1

It is certified that error appears in the above-identified patent and that said Letters Patent is hereby corrected as shown below:

In column 11, line 51, --the-- should be inserted after "comprises".

In column 11, line 52, --of-- should be inserted after "downloading".

In column 11, line 53, "2" should be --1--.

In column 12, line 41, --the-- should be inserted after "comprises".

In column 12, line 41, --of-- should be inserted after "downloading".

In column 12, line 61, "13" should be --11--.

In column 13, line 16, --interpreted-- should be inserted after "said".

In column 13, line 29, "4" should be --20--.

In column 13, line 32, "4" should be --20--.

Signed and Sealed this

Third Day of March, 2009

JOHN DOLL  
*Acting Director of the United States Patent and Trademark Office*